Sept. 19, 1933.  C. M. TERRY  1,927,448
VALVED COUPLING
Filed April 8, 1932
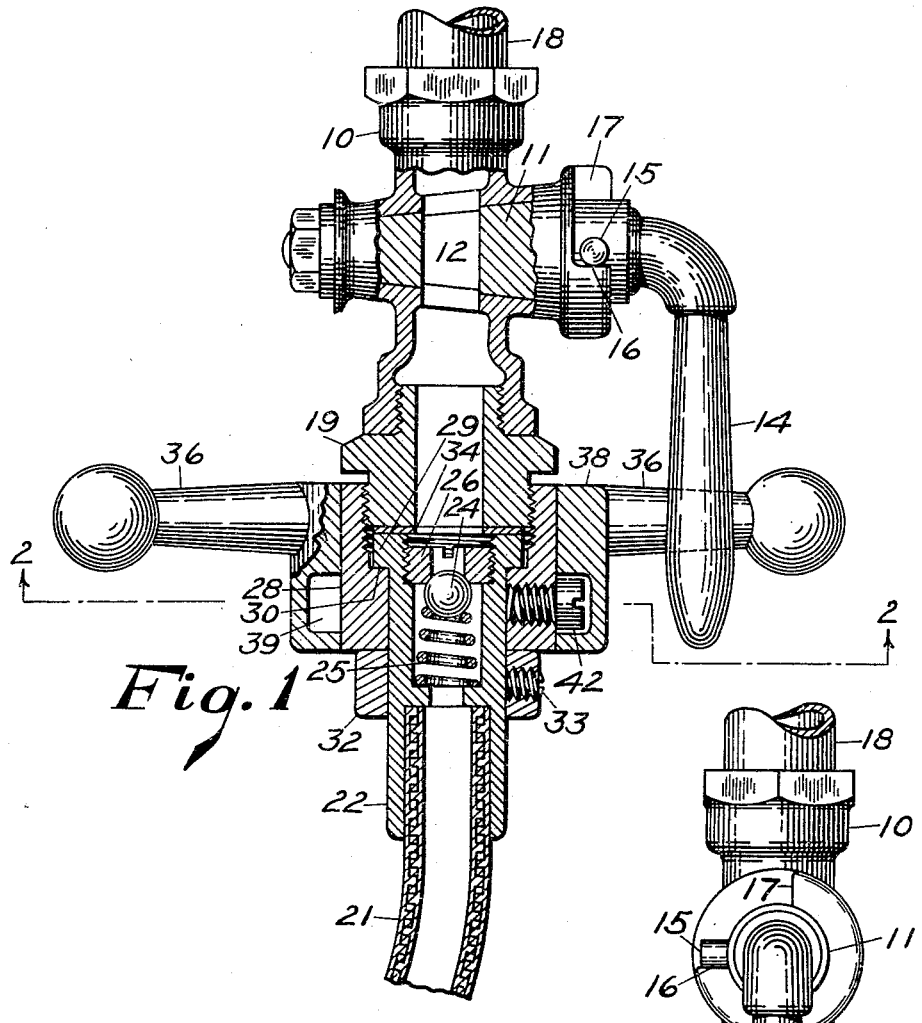
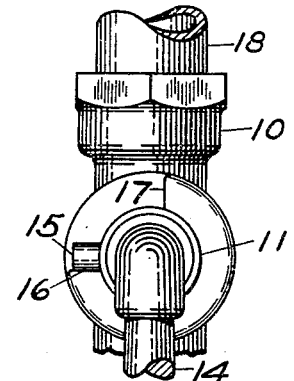
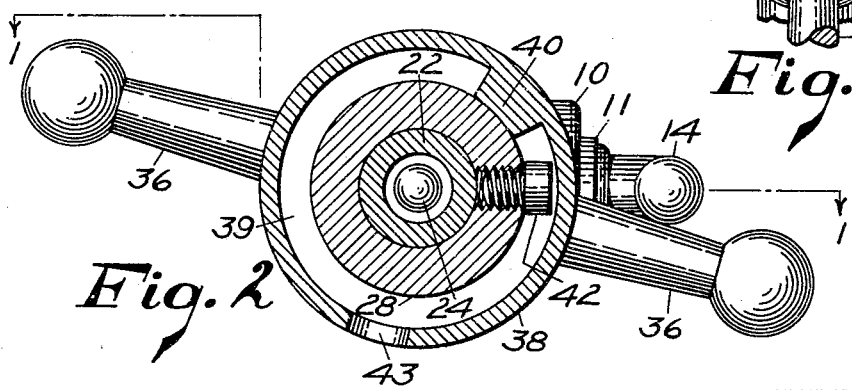
INVENTOR
CHARLES M. TERRY
BY
Albert G. Blodgett
ATTORNEY Patented Sept. 19, 1933

1,927,448

UNITED STATES PATENT OFFICE 1,927,448

VALVED COUPLING

Charles M. Terry, Decatur, Ill., assignor to A. W. Cash Company, Decatur, Ill., a corporation of Delaware Application April 18, 1932. Serial No. 604,048

4 Claims. (Cl. 284—18)

This invention relates to valved couplings, and more particularly to a coupling for a fluid conduit provided with a shut-off valve, the various parts being so interlocked that the coupling cannot be disconnected until the valve is closed.

A construction of this type is desirable whenever one fluid conduit is temporarily connected to a second conduit which carries fluid under pressure. Without a suitable interlocking mechanism, there is danger that a careless operator might loosen or entirely disconnect the coupling without first closing the valve, causing a leakage or waste of a possibly valuable fluid, and resulting in a serious fire hazard if the fluid is inflammable. While the advantages of an interlock in such cases have been realized heretofore, the prior constructions have been complicated, expensive, unreliable, or incapable of forming a tight joint, or for some other reason have proven to be unsatisfactory in actual operation.

It is accordingly one object of the present invention to provide an interlocked valved coupling which will be simple and inexpensive to manufacture and thoroughly reliable in operation.

It is a further object of the invention to provide a coupling which can be tightened to prevent all leakage of fluid, and which cannot be loosened at all without first closing a valve associated therewith.

It is a further object of the invention to provide an interlocked valve and coupling, the valve being of a common and well known construction which may be readily purchased upon the market, and the coupling being arranged to cooperate with the valve to provide the desired interlocking feature without the necessity of altering the valve in any respect.

With these and other objects in view, as will be apparent to those skilled in the art, the invention resides in the combination of parts set forth in the specification and covered by the claims appended hereto.

In accordance with my invention, I provide a pair of conduits which may be fastened together by a suitable coupling means. One of the conduits is provided with a valve which may be moved to an open or closed position. A manually operable device serves to actuate the coupling means, and this device has a lost motion connection with the coupling means. A member is arranged to move with the valve, and this member takes up such a position when the valve is open as to prevent the manually operable device from being moved sufficiently to loosen the coupling means.

Referring to the drawing illustrating one embodiment of the invention, and in which like reference numerals indicate like parts, Fig. 1 is a section through a valved coupling, the section being taken on the line 1—1 of Fig. 2, and certain parts being shown in full for clearness of illustration;

Fig. 2 is a section on the line 2—2 of Fig. 1; and

Fig. 3 is a side elevation of a portion of the construction shown in Fig. 1.

In the drawing I have illustrated a valve of the well known rotatable plug type comprising a body portion 10 and a valve member 11 extending transversely therethrough. The valve member 11 is preferably of tapered construction and provided with a transverse flow passage 12. The usual operating member or handle 14 is connected to the larger end of the valve member. A pin 15 projects radially from the larger end of the valve member 11, and cooperates with shoulders 16 and 17 formed on the body portion to limit the movement of the valve member between its open and closed positions. With the valve in the open position shown in the drawing, the handle 14 extends downwardly in the direction of flow through the valve. The upper or inlet end of the valve body 10 is connected to a pipe 18 which is supplied with fluid under pressure from any suitable source. At the lower or discharge end of the valve body I provide a hollow nipple 19 which is permanently connected thereto, preferably by means of screw threads. While the nipple 19 and valve body 10 could be made integral, I preferably form them as separate parts, so that I may utilize the ordinary type of valve having internally threaded inlet and discharge openings. It will be seen that the parts so far described provide a conduit through which fluid may flow, and that the valve provides a means for controlling this flow.

A second conduit is arranged to be connected to the nipple 19 temporarily, so that fluid from the pipe 18 may be transmitted under pressure to a desired place of use. This second conduit is shown as a flexible hose 21, of the well known interlocked metallic construction, with its upper or inlet end extending into a hollow sleeve 22. The sleeve is soldered or otherwise secured to the hose. It will be clear that other types of hose, or if desired a rigid pipe, may be utilized within the scope of my invention. A ball check valve 24 may be mounted within the sleeve 22 to prevent fluid from escaping from the hose when the two conduits are disconnected. A coil spring 25 urges the valve 24 upwardly against a seat ring 26 which is screw threaded into the upper end of the sleeve.

In order to fasten the two conduits firmly together, and yet permit them to be disconnected easily when desired, I provide a suitable coupling means, which I have shown as an annular member 28 screw threaded internally at its upper end to fit external screw threads on the lower end of the nipple 19. This member 28 is mounted on the sleeve 22, and is preferably free to rotate thereon, so that the coupling may be connected or disconnected without rotating the hose 21. As illustrated, the sleeve 22 is formed with an outwardly projecting flange 29 at its upper or inlet end, and the coupling member 28 is shaped internally to provide a shoulder 30 in contact with the lower surface of the flange. The member 28 is held in place by a collar 32 mounted therebeneath on the sleeve 22, a set screw 33 serving to fasten the collar to the sleeve.

It will now be seen that when the coupling member 28 is screwed into place on the nipple 19, it will draw the sleeve 22 upwardly to form a tight joint with the lower end of the nipple. If desired, an annular gasket 34 of comparatively soft material may be provided between these parts to reduce the possibility of leakage. In order that the coupling member may be readily rotated by hand, I provide one or more suitable handles 36, two being illustrated. The handles 36 extend radially outward in diametrically opposite positions, and they are so arranged that their movement will be obstructed by the valve handle 14 when the valve is in the open position. The coupling therefore cannot be disconnected until the valve is closed.

The handles 36 could be formed integral with the coupling member 28 or they could be rigidly attached thereto, but either of these constructions would have certain serious disadvantages. It will be apparent that the exact position of the handles with the coupling tightly drawn together could not be predetermined unless the screw threads were indexed and a gasket of predetermined thickness utilized. This would render the cost of manufacture prohibitive. Moreover, even though the parts were originally constructed with extreme accuracy, wear on the gasket and screw threads caused by connecting and disconnecting the coupling would affect the final handle position. It will therefore be seen that one of the handles 36 may, when the coupling is tightened, lie in the path of the valve handle 14 and interfere with the opening of the valve. This would necessitate backing off the coupling member a little, if the handle were rigid therewith, and it would be impossible to prevent leakage of fluid at the joint. Furthermore, regardless of the final position of the handles, a careless operator might loosen the coupling member a fractional part of a turn before further movement would be blocked by the valve handle, and as a result leakage of a possibly dangerous or valuable fluid would occur.

These difficulties are avoided by the construction illustrated, in which the handles 36 have a lost motion connection with the coupling member 28. As shown in the drawing, the handles 36 are formed integral with a hollow cylindrical member or collar 38 which is rotatably supported on the member 28 to form an operating device, suitable abutments being provided to limit the possible relative motion between these parts. The collar 38 is provided with a groove 39 which extends over half way and preferably almost entirely around its inner circumference, a small portion 40 (Fig. 2) being left to form an abutment or shoulder. A fillister head screw 42 is threaded into the coupling member 28 with the head of the screw positioned in the groove 39 to form an abutment and also to prevent axial movement of the collar 38 relative to the coupling member. A small opening 43 (Fig. 2) is provided in the outer wall of the collar 38 to permit insertion of the screw at assembly. The screw is too short to strike the sleeve 22, and hence does not interfere with the free rotation of the coupling member on the sleeve.

The operation of the invention will now be apparent from the above disclosure. The pipe 18 is connected to a source of fluid under pressure, and the hose 21 leads to an apparatus for utilizing the fluid, such as for example, an oil burning nozzle adapted to produce an ignition flame for a pulverized coal burner. With the coupling connected and the valve open as shown in the drawing, fluid may flow from the pipe 18 into the hose 21. If now the operator wishes to disconnect the hose, perhaps to use it in some other location, and he carelessly attempts to unfasten the coupling without first closing the valve, he will find that the valve handle 14 will prevent the handles 36 from being revolved sufficiently to move the coupling member 28. It will be noted that the collar 38 must be rotated almost a whole revolution before the abutment 40 will strike the head of the screw 42 to loosen the coupling, and before this can happen one of the handles 36 is certain to contact with the valve handle if the valve is open. After the valve is closed the coupling can be readily disconnected, and dripping of fluid from the hose will be prevented by the check valve 24. When the coupling is tightly connected once more and the operator attempts to open the valve, he may find that one of the handles 36 is in the path of movement of the valve handle 14 and thus prevents opening of the valve. All that is necessary is to turn the handle 36 slightly in the loosening direction to allow the valve to be opened. This will not loosen the coupling however, because of the lost motion connection between the collar 38 and the coupling member 28.

It will be seen that I have provided a simple and inexpensive interlocked valved coupling which is fool-proof and reliable in operation. The joint can be assembled as tightly as desired, and the valve can be opened regardless of the final position of the coupling handles. There is no possibility of loosening or disconnecting the coupling without first closing the valve. The construction is such that a standard valve may be utilized without alteration.

Having thus described my invention, what I claim as new and desire to secure by Letters Patent is:

1. A valved coupling comprising a conduit having a flow controlling valve therein, said valve being movable from an open to a closed position, a second conduit, coupling means for fastening the two conduits together, a manually operable device for actuating the coupling means and having a lost motion connection with the coupling means, and a member movable with the valve and so positioned when the valve is open as to prevent the manually operable device from being moved sufficiently to loosen the coupling means.

2. A valved coupling comprising a conduit having a flow controlling valve therein, a second conduit, coupling means rotatably mounted on the second conduit for fastening the two conduits together, an operating device rotatably mounted on the coupling means, abutments arranged to limit the possible relative motion between the operating device and the coupling means, a handle projecting from the operating device, and an operating member for the valve, said parts being so arranged that when the valve is open the operating member will lie in the path of the handle and thus prevent the operating device from being moved sufficiently to loosen the coupling means.

3. A valved coupling comprising a conduit provided with a rotatable plug valve to control the flow therethrough, said conduit having external screw threads adjacent to its discharge end, a hollow sleeve having an outwardly projecting flange at one end, an annular coupling member rotatably mounted on the sleeve and shaped internally to provide a shoulder which contacts with the flange, said coupling member being provided with internal screw threads which cooperate with said external screw threads to fasten the sleeve against the conduit, an annular operating device rotatably mounted on the coupling member, abutments arranged to limit the relative motion between the operating device and the coupling member while permitting over half a revolution of such relative motion, at least two spaced handles projecting from the operating device, an operating member for the valve, and means to limit the movement of the operating member so that when the valve is open the operating member will lie in the path of the handles and thus prevent the operating device from being moved sufficiently to loosen the coupling member.

4. A valved coupling comprising a conduit provided with a rotatable plug valve to control the flow therethrough, said conduit having external screw threads adjacent to its discharge end, a hollow sleeve having an outwardly projecting flange at one end, an annular coupling member rotatably mounted on the sleeve and shaped internally to provide a shoulder which contacts with the flange, said coupling member being provided with internal screw threads which cooperate with said external screw threads to fasten the sleeve against the conduit, an annular operating device rotatably mounted on the coupling member, said operating device having a groove extending over half way around its inner circumference, an abutment fixed to the coupling member and located within the groove to cooperate with the ends of the groove and form a lost motion connection between the coupling member and the operating device, two handles projecting in diametrically opposite directions from the operating device, an operating member for the valve, and means to limit the movement of the operating member so that when the valve is open the operating member will lie in the path of the handles and thus prevent the operating device from being moved sufficiently to loosen the coupling member.

CHARLES M. TERRY.